Dec. 25, 1951  M. KLEIN  2,579,931
DEFROSTING APPARATUS FOR FREEZING MOLDS
Filed Sept. 21, 1949  5 Sheets-Sheet 2
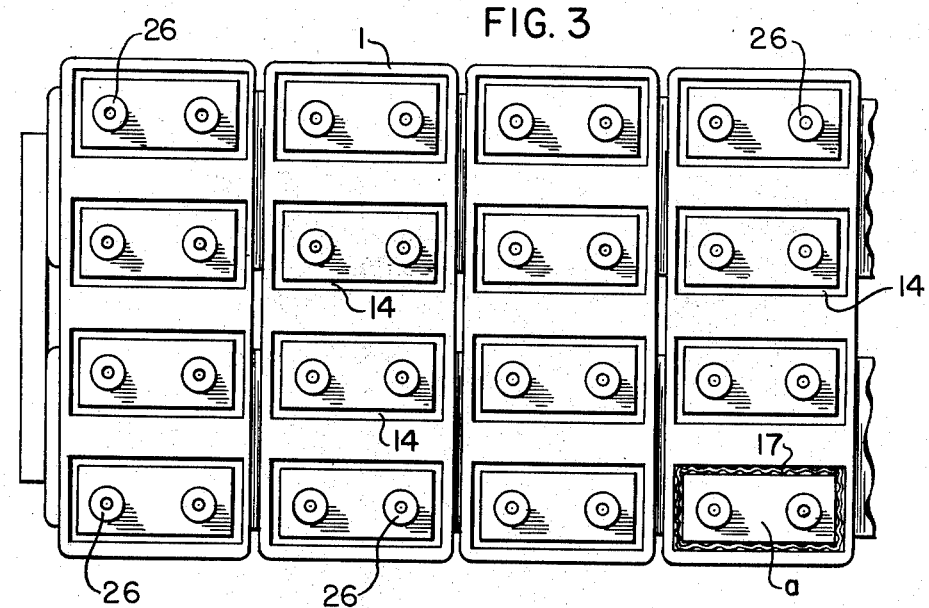
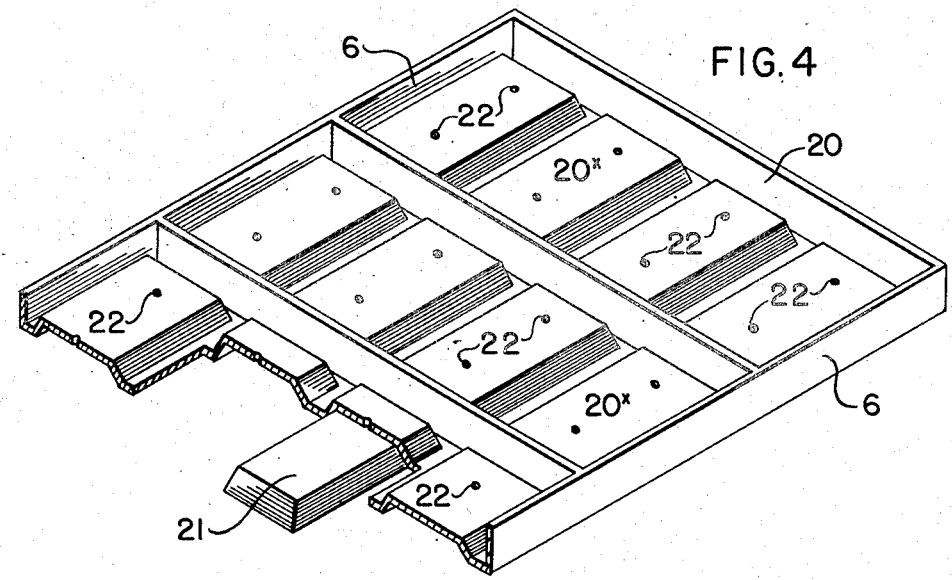
INVENTOR.
Morris Klein
BY
W. Lee Helms
ATTORNEY Dec. 25, 1951 M. KLEIN 2,579,931
DEFROSTING APPARATUS FOR FREEZING MOLDS
Filed Sept. 21, 1949 5 Sheets-Sheet 3
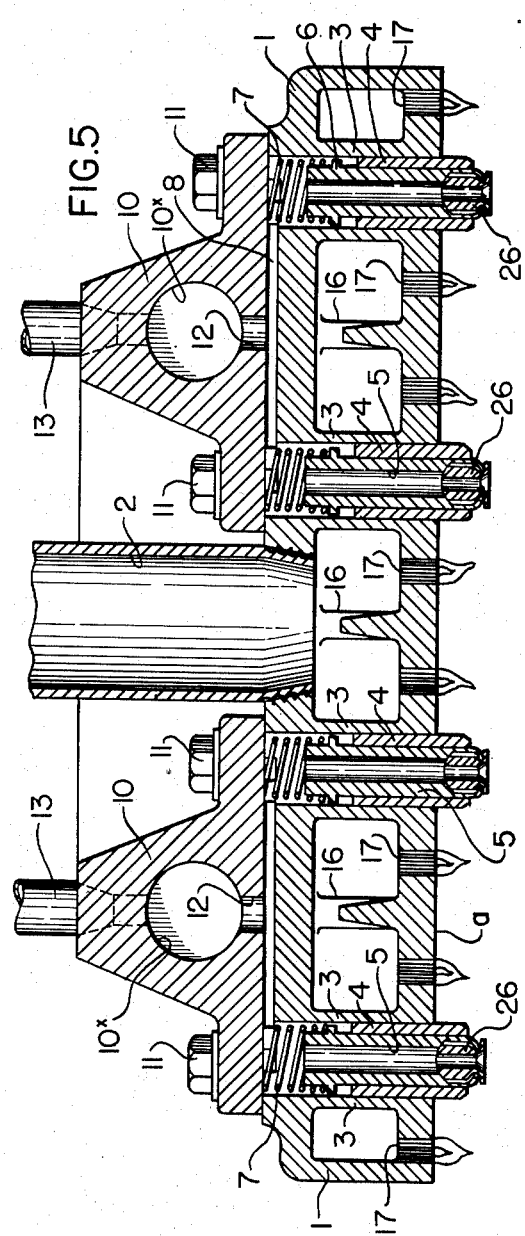
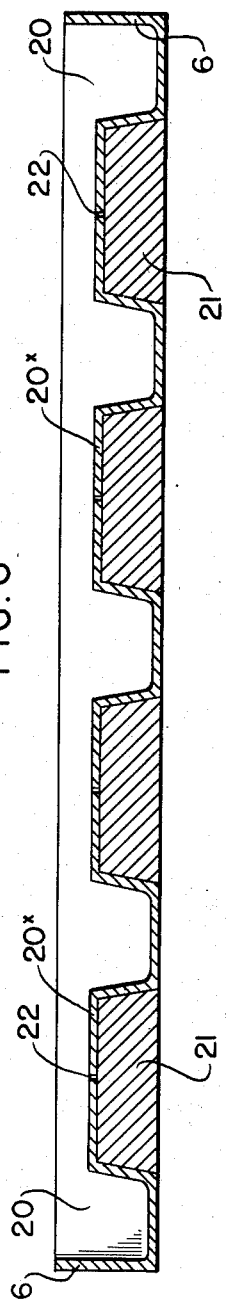
INVENTOR.
Morris Klein
BY
W. Lee Helms
ATTORNEY

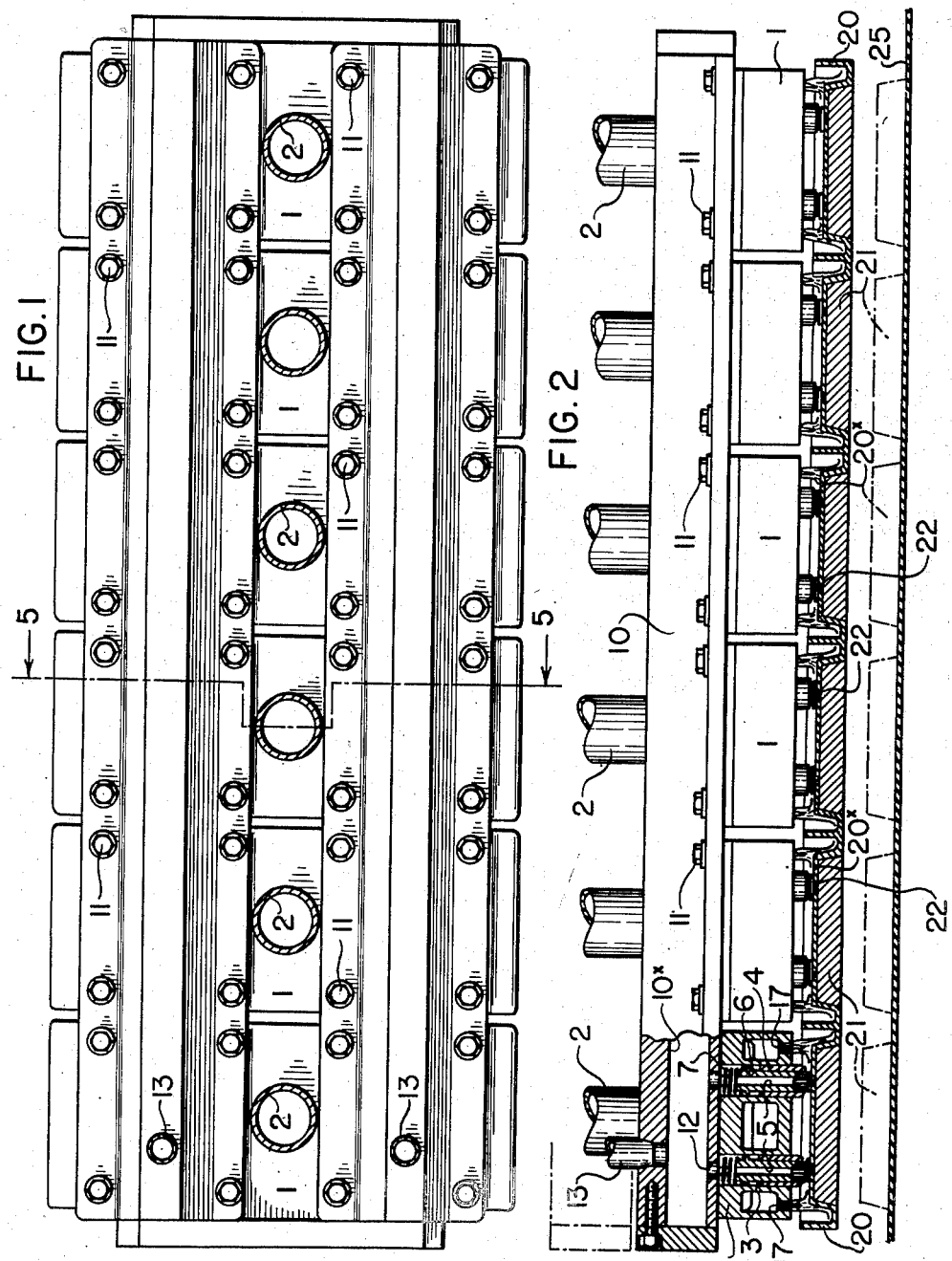

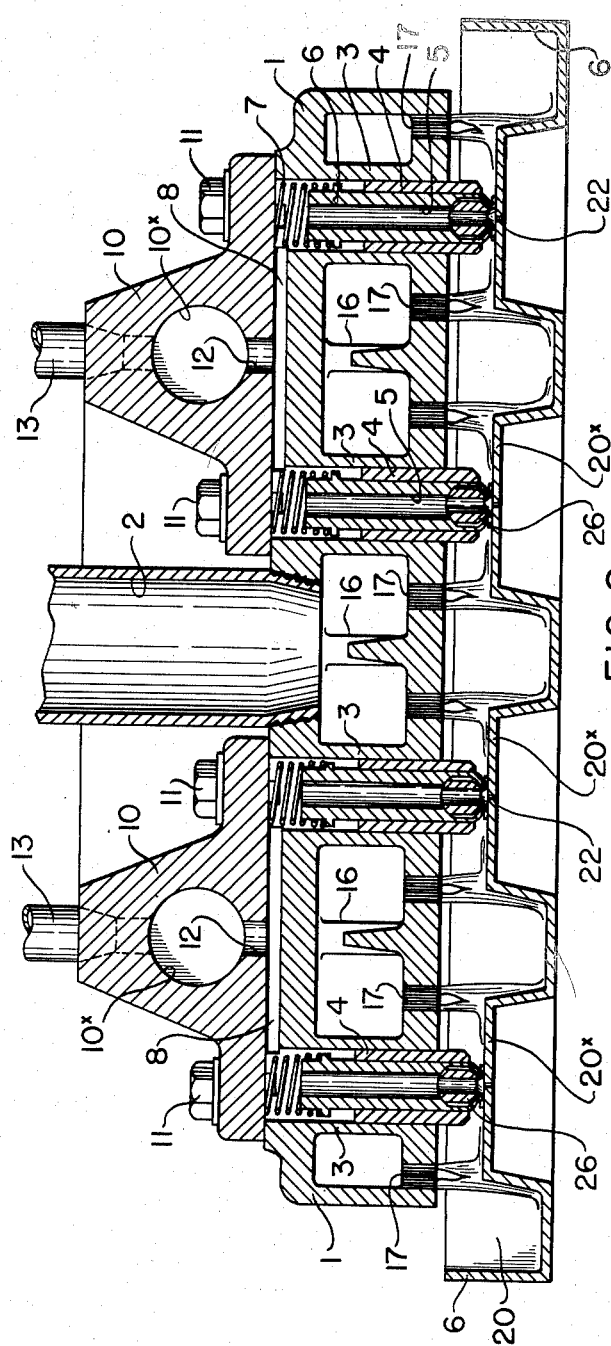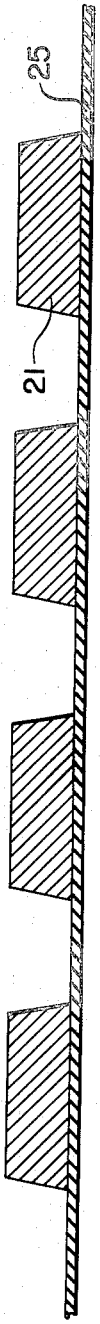

Dec. 25, 1951  M. KLEIN  2,579,931
DEFROSTING APPARATUS FOR FREEZING MOLDS
Filed Sept. 21, 1949  5 Sheets-Sheet 5
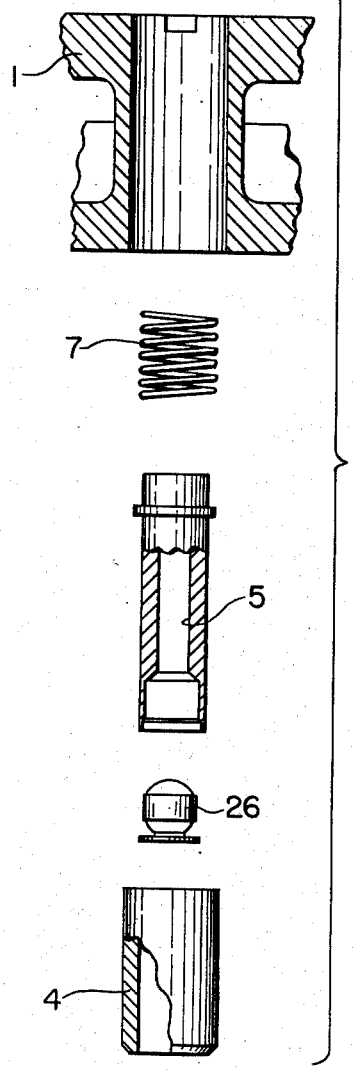
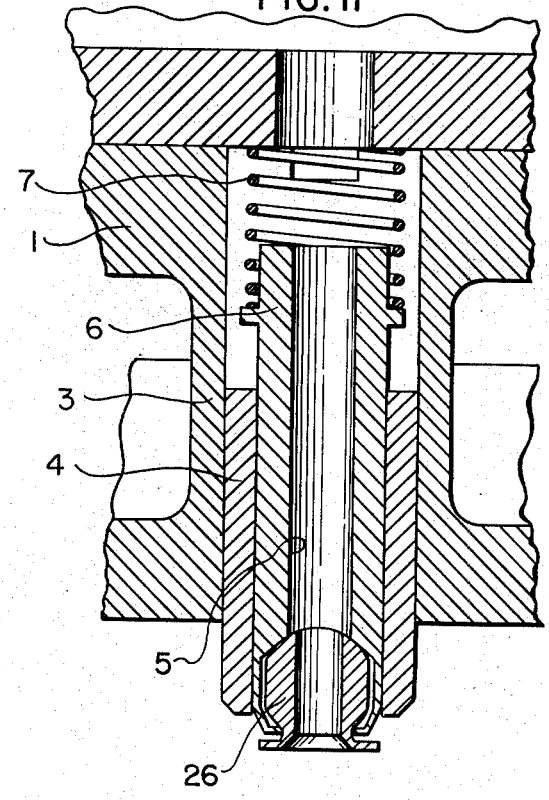
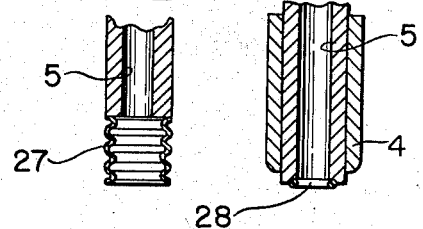
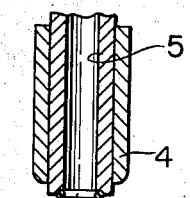
Morris Klein
INVENTOR.
BY W. Lee Helms
ATTORNEY Patented Dec. 25, 1951

2,579,931

UNITED STATES PATENT OFFICE 2,579,931

DEFROSTING APPARATUS FOR FREEZING MOLDS

Morris Klein, Bloomfield, N. J., assignor to Eskimo Pie Corporation, Bloomfield, N. J., a corporation of Delaware Application September 21, 1949, Serial No. 116,887

2 Claims. (Cl. 62—114)

The object of the present invention is to provide means for rapidly defrosting metallic mold members which in action will hold a plurality of rows of ice cream blocks or bars, or other frozen products, and which will eject said products from the mold cavities. The defrosting is accomplished by applied heat, and the ejection accomplished by means of compressed air, in those cases where the adhesion of the frozen products to the mold cavities is so tenacious that means supplementary to the applied heat is desirable for rapid release of said frozen products.

The invention will be described with reference to the accompanying drawings, in which:

Fig. 1 is a top plan view, certain tubular elements being broken away showing an embodiment of the defrosting unit, or, more properly, an assembly of individual units;

Fig. 2 is a view of the structure shown in Fig. 1 in side elevation, partly broken away;

Fig. 3 is a bottom plan view of the structure shown in Fig. 1, part of its right hand area being broken away;

Fig. 4 is a perspective view showing one end section of a mold member, broken away from its remaining area and from part of a frozen article at a mold cavity thereof;

Fig. 5 is a transverse sectional elevation taken on the line 5—5, Fig. 1;

Fig. 6 is an enlarged transverse section through a mold, with frozen articles in the mold cavities thereof.

Fig. 7 indicates in longitudinal section a belt or support on which the frozen articles will be dropped upon defrosting of the mold;

Fig. 8 is a view similar to Fig. 5 showing the distribution of the flame from burner elements with respect to the mold cavities;

Fig. 9 illustrates in section, and in relation to Fig. 8 the released frozen articles on a belt or other support;

Fig. 10 is a schematic separated view showing the elements of the pressure assembly in their relative succession;

Fig. 11 is a view in vertical section showing the elements of Fig. 10 in assembled condition;

Fig. 12 is a fragmentary view in vertical section showing the lower end of a pressure tube with a metal bellows type of conforming end;

Fig. 13 illustrates in vertical section a pressure tube in its surrounding sleeve and carrying at its end a ring-shaped conforming element.

In the manufacture of frozen articles, as of the type of ice cream blocks and bars, it is customary to employ molds, each having twenty-four mold cavities for reception of the mixture to be frozen. After the freezing operation the molds are "defrosted," the latter being a term used in the trade to define an operation in which the walls of the metallic mold receive heat to break the bond of adherence between the frozen articles and the walls of the mold cavities.

The present invention provides apparatus for quickly and effectively performing this stated operation with respect to plural cavity molds and the like of any size.

Referring to the drawings I have indicated in Figure 1 a defrosting apparatus adapted for application to a mold having twenty-four cavities arranged in rows of six each. The apparatus consists of six heating and pressure units arranged in parallel and having overhead manifolds, two in number for the admission of air under pressure, and also having means for the admission of a fuel gas.

In the present embodiment each heating and pressure unit consists of a cast block 1 formed with a hollow interior to provide passageways for fuel gas led into the block by a pipe 2. Each block is formed with four sets of spaced tubular guiding walls, indicated at 3, thus providing eight spaced annular chambers, each for the reception of a guiding sleeve 4 within which is a movable pressure tube 5, the latter near its upper end having a shoulder 6 which will abut the top of sleeve 4 when the pressure tube has moved downward to extreme position. Bearing upon the shoulder 6 of each pressure tube is a coiled spring 7.

At two spaced areas each intermediate two of the pressure tubes 5, the block 1 is formed with a depression as indicated at 8, Fig. 8. Transversely extending across the assembly of blocks as shown in Figs. 1 and 2 are two manifolds 10 which are bolted in position by the bolts 11, thus covering the depressions at 8. Each manifold has a longitudinally extending cavity as indicated at 10x and each cavity by means of a bore 12 is in communication with the depressed areas of each block 1, and the latter, as shown in Fig. 8 is in communication with each pressure tube 5. It will thus become apparent that air admitted to each manifold by means of pipe 13, and under pressure, will result in discharge of said air through the lower end of each pressure tube. The lower wall of each block 1 is formed with a rectangular through-cut at 14, Fig. 3, at each of four spaced positions, and the metal wall area intermediate each cut 14 is suspended by a cast bridge or strut depending from the upper wall of the block. As shown in Figure 8 the two end strut or bridge members are formed by the annular walls 3 which encircle the pressure tube sleeves 4.

Within each rectangular cut is fitted a corrugated strip or strips as at 17, Fig. 3, so as to provide a burner orifice, although the rectangular burner orifice may be formed in any other suitable manner as by spaced perforations for example.

Fuel gas admitted into each hollow block 1 through pipe 2 will circulate from end to end of the block and will pass through the burner orifice formations 17 for ignition exteriorly thereof.

The apparatus just described is adapted for application to an inverted mold member having a plurality of spaced mold cavities, as for example, that shown in Figures 4, 6 and 8 at 20, frozen blocks being molded thereby being indicated at 21. Reference to the said figures will show that each mold cavity 20x is formed with through apertures or holes, one for each of the pressure tubes 5, these holes being indicated at 22.

Such a mold as described and shown holding frozen confections in Fig. 6, will be inverted as indicated in that figure. Thereupon the defrosting assembly will be brought down into engagement with the inverted mold, as shown in Fig. 8. The pressure tubes will thus be brought into register with the mold cavity apertures simultaneously with rectangular ribbons of flame from the burners, the latter in a matter of seconds transmitting sufficient heat to the metal walls of the mold cavities for defrosting and release of the frozen ice cream or other block 21, when augmented by the releasing effect of the air jets through the pressure tubes 5. The blocks will, of course, receive heat from the burners and the jets of air will be heated accordingly.

In practice the released frozen blocks will fall upon a carrier 25, which may be a belt, for removal to coating, packaging and/or other stages, as desired.

In order to secure sealing conformation of the pressure tube ends with the mold cavity areas surrounding the air holes, I have shown, particularly in Fig. 11, a contact member 26 formed with a rounded top abutment with an annular lower face, the top of said contact member being loosely received within the lower cavity of pressure tube 5, the thin lower wall of which is swaged inwardly to hold such "rocking" contact member in position. A modification is shown in Fig. 12 wherein the pressure tube 5 has applied thereto a metallic compressible bellows formation 27, of known form, and which will return when pressure is removed therefrom. In the modification shown in Fig. 13 the pressure tube 5 has applied thereto at its end a simple yielding ring 28 which may be of rubber or other suitable material.

It will be understood that various modifications may be made in the form and arrangement of the elements constituting the embodiment of the invention illustrated in the drawings without departing from the spirit of the invention.

Thus it will be understood that the device is applicable to molds in which the mold cavities will be round or of any suitable shape and that the burner outlets may be modified accordingly, the specific form of the burner outlets being changed in accordance with the wall areas to receive the flame.

Having described my invention, what I claim and desire to secure by Letters Patent is as follows:

1. An apparatus for removing frozen material from molds containing a plurality of mold cavities, said apparatus comprising a plurality of hollow casings arranged in parallelism, and having lower base walls lying in a common plane, manifold members for receiving air under pressure, a plurality of pressure tubes extending vertically through the casings and in communication with said manifolds, a plurality of burner-outlets in the base walls of the casing, means for admitting fuel gas into the hollow casing, and having guide means extending within and vertically through each casing, each of said pressure tubes being vertically slidable within a respective guide means, spring means engaging each pressure tube for imparting downward movement thereto, and coacting abutment means fixed to each casing and mounted on each pressure tube for limiting said downward movement.

2. An apparatus for removing frozen material from molds containing a plurality of mold cavities, said apparatus comprising a plurality of hollow casings arranged in parallelism, and having lower base walls lying in a common plane, manifold members for receiving air under pressure, a plurality of pressure tubes extending vertically through the casings and in communication with said manifolds, a plurality of burner-outlets in the base walls of the casing, means for admitting fuel gas into the hollow casing, and a mold containing a plurality of mold cavities each having a downwardly facing opening and each lying adjacent to and subjected to the action of at least one of said pressure tubes and at least one of said burner-outlets, whereby each mold cavity may be simultaneously subjected to heat from its respective burner and air pressure from its respective pressure tube so that when sufficient heat has been applied to the mold cavity the frozen material will fall downwardly therefrom and thereby automatically prevent the frozen material from being subjected to more heat than is necessary for removal.

MORRIS KLEIN.

REFERENCES CITED

The following references are of record in the file of this patent:

UNITED STATES PATENTS

| Number | Name | Date |
|---|---|---|
| 1,221,321 | Hendler | Apr. 3, 1917 |
| 1,936,584 | Cobb | Nov. 28, 1933 |
| 1,992,135 | Underwood | Feb. 19, 1935 |
| 2,385,539 | Pownall | Sept. 25, 1945 |